(12) United States Patent
Walsh

(10) Patent No.: US 6,257,639 B1
(45) Date of Patent: Jul. 10, 2001

(54) CARGO CARRYING DECK FOR THE TRACTOR OF A SEMITRAILER TRUCK

(76) Inventor: Alan J. Walsh, 9606 Belford Ave., Apt. 3, Los Angeles, CA (US) 90045

( * ) Notice: Subject to any disclaimer, the term of this patent is extended or adjusted under 35 U.S.C. 154(b) by 0 days.

(21) Appl. No.: 09/327,273

(22) Filed: Jun. 7, 1999

(51) Int. Cl.[7] ....................................................... B60P 3/34
(52) U.S. Cl. ......................................... 296/26.11; 296/183
(58) Field of Search ............................ 419/469; 296/183, 296/182, 26.11, 10

(56) References Cited

U.S. PATENT DOCUMENTS

| | | | |
|---|---|---|---|
| 2,783,080 | * 2/1957 | Ringsby | 296/50 |
| 4,078,818 | * 3/1978 | Donnelly | 280/418.1 |
| 4,614,477 | * 9/1986 | Hagenbuch | 414/809 |
| 4,662,670 | * 5/1987 | Kemmer | 296/35.3 |
| 4,702,510 | * 10/1987 | Davis | 296/35.3 |
| 4,969,690 | * 11/1990 | Smith | 298/17 R |
| 5,785,485 | * 7/1998 | Hall | 414/498 |

* cited by examiner

Primary Examiner—Robert P. Olszewski
Assistant Examiner—Andrew J. Fischer
(74) Attorney, Agent, or Firm—Timothy Thut Tyson; Ted Masters; Freilich, Hornbaker & Rosen

(57) ABSTRACT

Cargo carry apparatus (20) for a tractor (500) for a semitrailer truck includes a rotatable deck (22) mounted between the fifth wheel (502) and the cab which pivots from a vertical position to a horizontal position until the deck rests upon the fifth wheel. With the deck in the horizontal position, the tractor may be utilized to transport cargo to sites which are inaccessible to the semitrailer truck. A variable length controller (32) such as a hydraulic cylinder is used to rotate the deck. The deck has slots (40) which accept stakes (42) to enclose the deck.

1 Claim, 5 Drawing Sheets

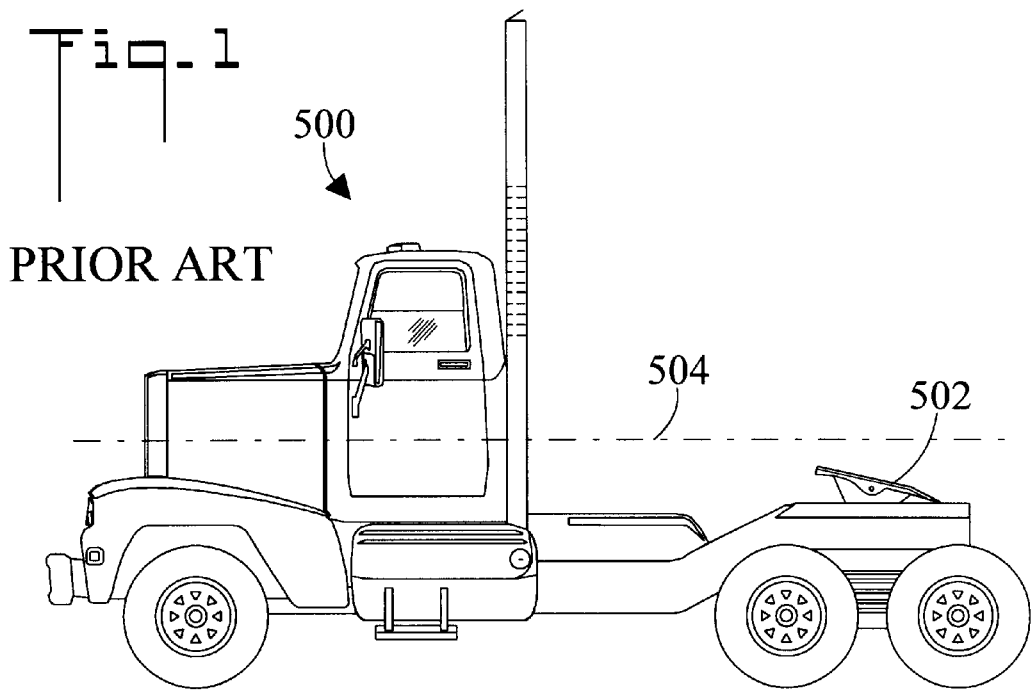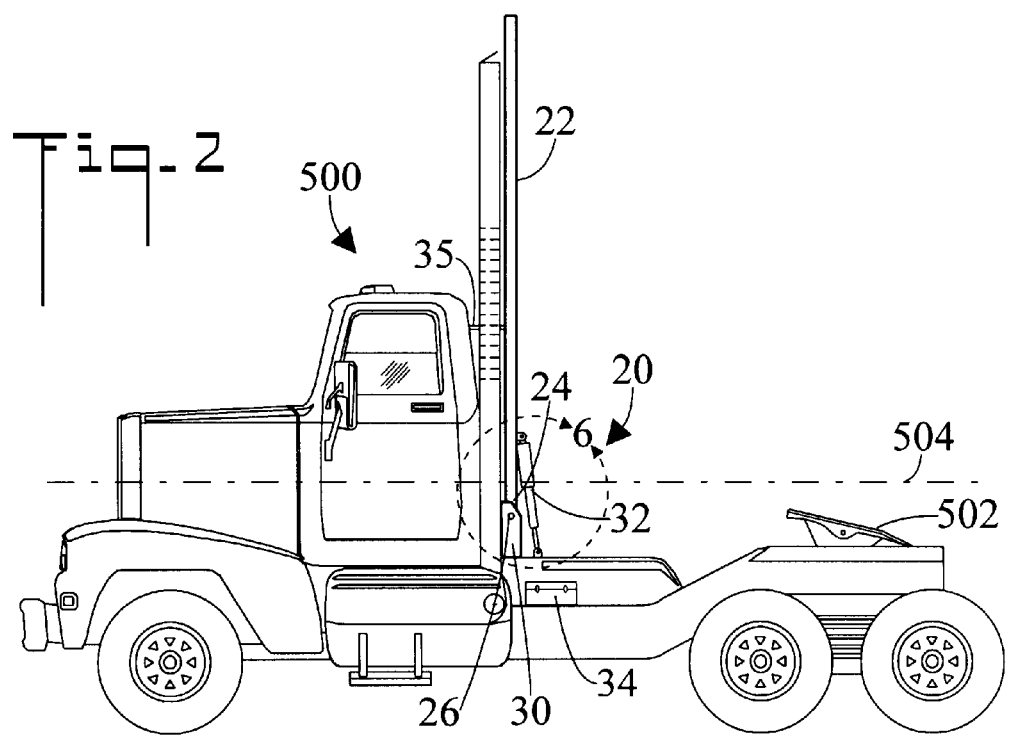

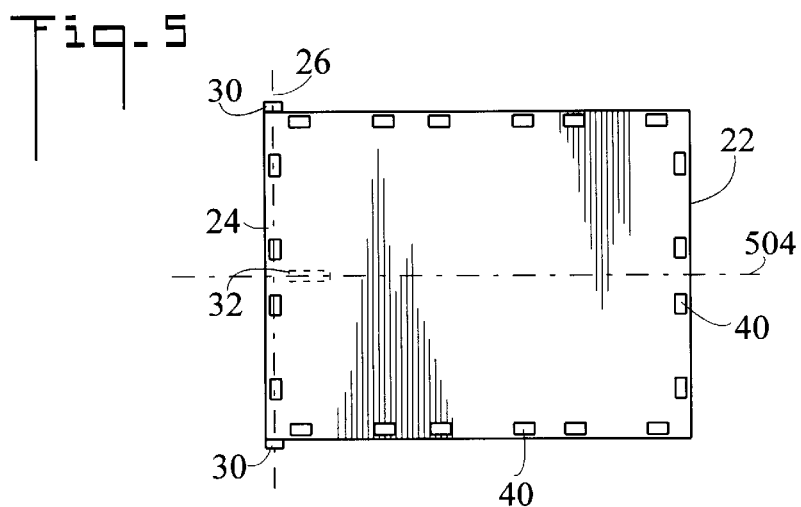
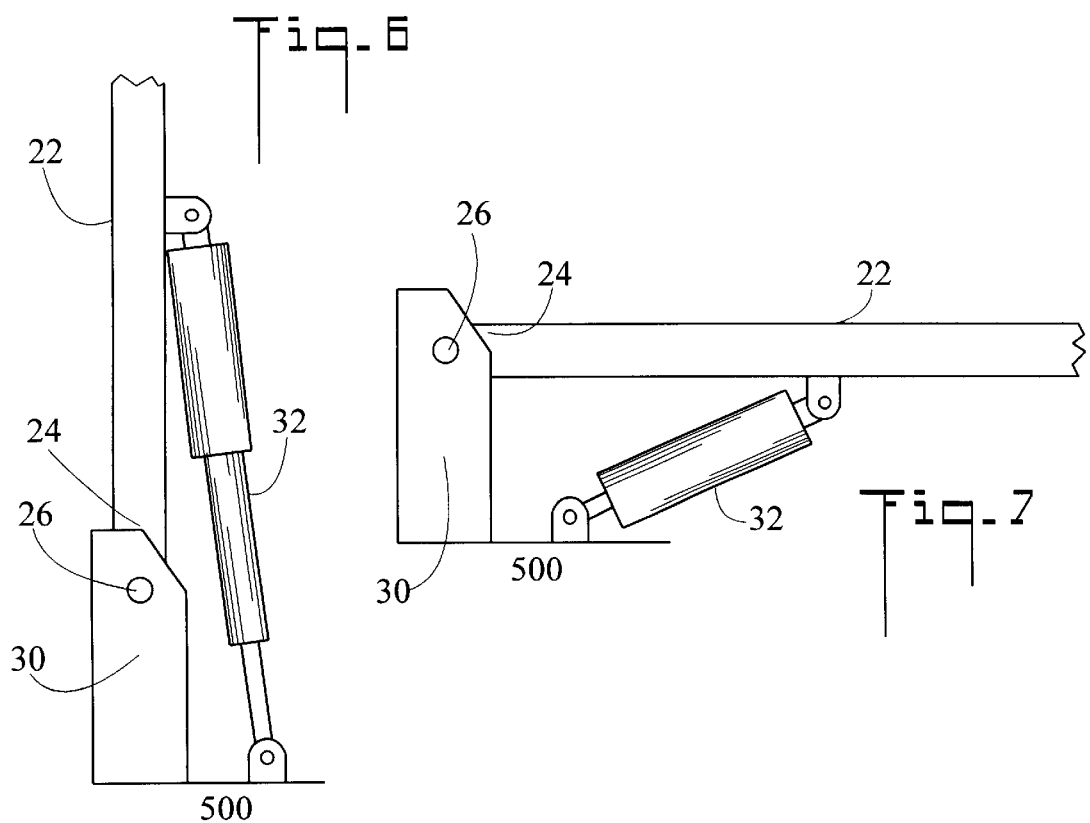

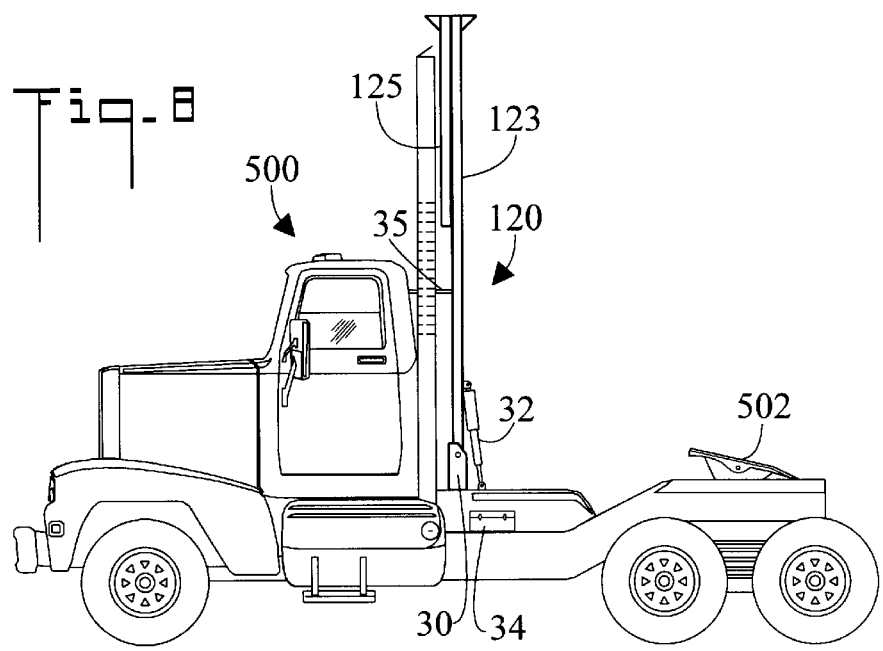
Fig_8
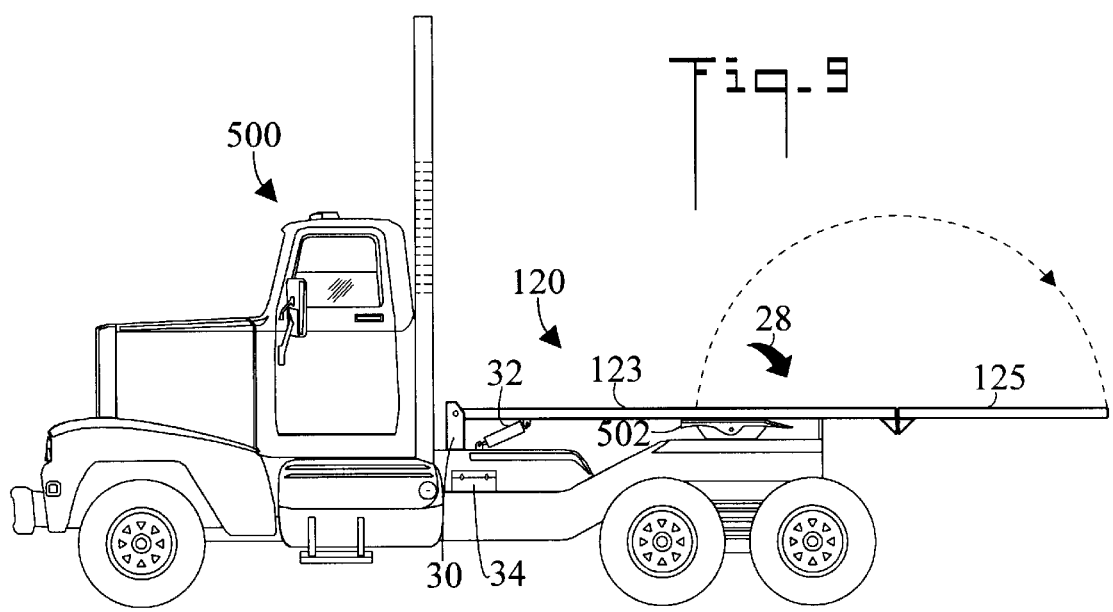
Fig_9

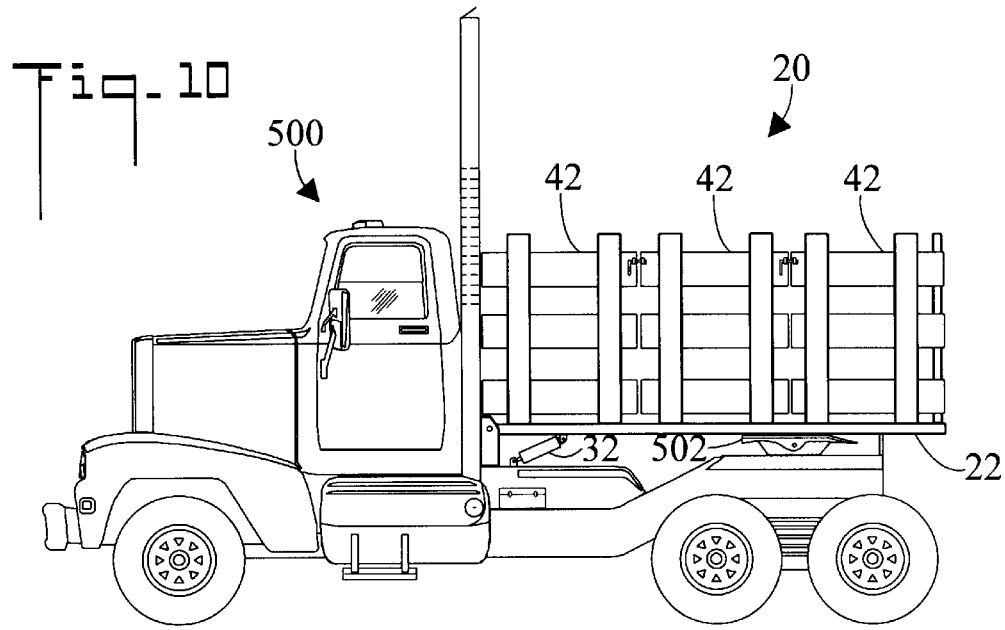
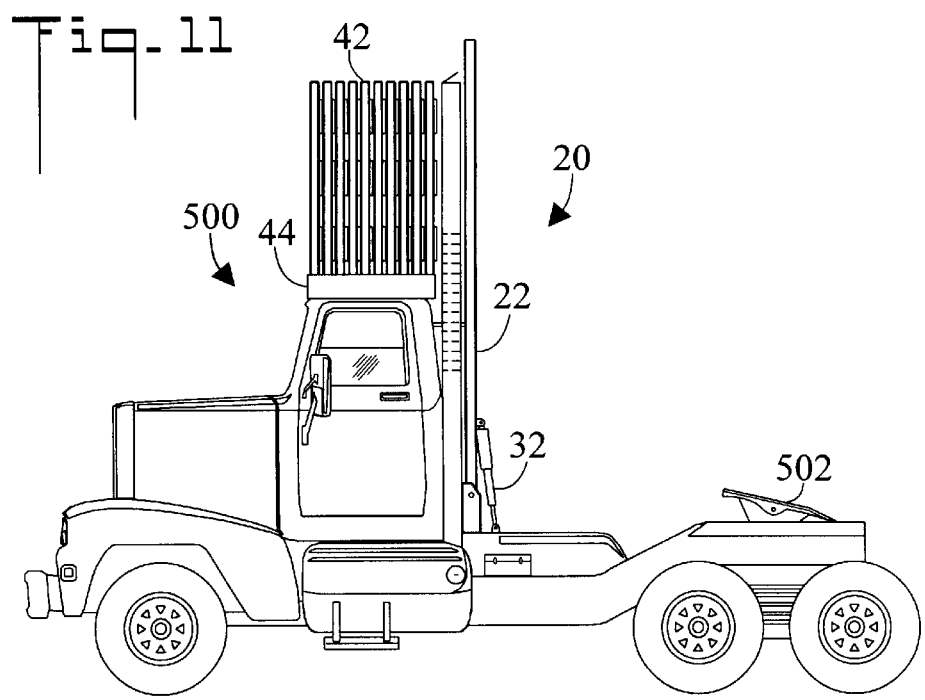

CARGO CARRYING DECK FOR THE TRACTOR OF A SEMITRAILER TRUCK

TECHNICAL FIELD

The present invention pertains generally to the field of semitrailer trucks, and in particular to a rotatable deck for the tractor which converts the tractor into a cargo carrying vehicle.

BACKGROUND ART

Semitrailer trucks are utilized throughout the world to transport a variety of goods and materials. Tractors pull the semitrailers in which the goods and materials are loaded. The tractor is typically attached to the semitrailer by means of a fifth wheel on the tractor holding and supporting a kingpin on the semitrailer which permits articulation between the two vehicles.

A semitrailer truck has little difficulty traveling on highways and the wide streets of most cities. However, the narrow roads and streets typically found in residential neighborhoods and remote locations can present problems for the rather large and unmaneuverable semitrailer truck. If the semitrailer truck cannot negotiate a narrow road, the cargo has to be offloaded to a smaller vehicle such as a panel truck to effect delivery to its final destination. This is obviously disadvantageous from a cost standpoint in that two vehicles and two drivers are required to implement the cargo delivery.

The tractor of a semitrailer truck by itself can usually negotiate the narrow roads after the semitrailer is unlocked but the tractor has no cargo carrying capabilities. Tractors have been modified to lift and carry automobile over their cabs by using hydraulic lifts but these lifts are not for ordinary goods. Hydraulic platforms are commonly added to two axle cargo trucks to lift goods from the street to the beds of the trucks such as seen in U.S. Pat. No. 4,078,676. Similar lift platforms are often seen on semitrailers for the same purpose. However, such lift gates have no use on the tractor of a semitrailer truck because there is no platform on the truck to carry goods after they are lifted.

In view of the above, there exists a need to provide a better way to deliver cargo to a difficult location that is not able to receive a semitrailer truck. It is toward this goal that the inventive concepts of the present invention are directed.

DISCLOSURE OF INVENTION

The present invention is directed to a rotatable deck for the tractor of a semitrailer truck which converts the tractor into a cargo carrying vehicle. The present invention thereby solves the aforementioned problem of requiring the presence of two vehicles and two drivers to deliver cargo to sites located in areas having narrow or otherwise less accessible roads. Instead of offloading the cargo onto a second vehicle, the driver unhooks the semitrailer and drives around to the open doors at the side or back of the semitrailer. The rotatable deck of the tractor is lowered to a horizontal position until the deck rests upon the fifth wheel at substantially the elevation of the bed of the semitrailer. The cargo may then be offloaded onto the deck, and transported using several trips to the final destination by the tractor. By virtue of the present invention, the tractor is transformed into a smaller cargo carrying vehicle which is capable of negotiating narrow roads and streets. The need for a second vehicle and driver is eliminated and the cost of delivery resultantly decreased.

In accordance with a preferred embodiment of the invention, the cargo carrying apparatus for a tractor having a fifth wheel and a longitudinal axis includes a cargo deck having an end portion. The end portion is rotatably connected to the tractor and rotates around a pivot axis which is substantially perpendicular to the longitudinal axis of the tractor and located behind the cab of the tractor. In a preferred embodiment, the deck rests upon and is supported by the fifth wheel.

In accordance with an important aspect of the invention, the deck is rotatably connected to at least two spaced brackets which are connected to the tractor in front of the fifth wheel and behind the cab.

In accordance with an important feature of the invention, at least one variable length controller is connected between the deck and the tractor, and is used to move the deck between the vertical and horizontal positions.

In accordance with another important aspect of the invention, the deck is substantially rectangular and has a plurality of stake receiving slots.

In accordance with another important feature of the invention, a plurality of stakes are selectively installed in the stake receiving slots so that the deck is enclosed.

In accordance with another aspect of the invention, the tractor has a cab with a top. A rack is connected to the top for storing the stakes when the stakes are not in use.

In accordance with another feature of the invention, the deck has a main portion and an extension portion which is rotatably connected to the main portion. When the main portion is rotated to the horizontal orientation, the extension portion is rotated about the main portion to form a longer deck.

Other features and advantages of the present invention will become apparent from the following detailed description, taken in conjunction with the accompanying drawings, which illustrate, by way of example, the principles of the invention.

BRIEF DESCRIPTION OF DRAWINGS

FIG. 1 is a side elevation view of a prior art tractor for a semitrailer truck;

FIG. 2 is a side elevation view of the cargo carrying apparatus of the present invention installed on the tractor, showing the cargo deck in its raised upright orientation;

FIG. 5 is a top plan view of the deck;

FIG. 6 is an enlarged view of area 6 of FIG. 2;

FIG. 7 is an enlarged view of area 7 of FIG. 4;

FIG. 8 is a side elevation view of a second embodiment of the cargo carrying apparatus with the deck in the upright orientation and having a rotatable extension portion;

FIG. 9 is a side elevation view of the second embodiment in the lowered horizontal orientation;

FIG. 10 is a side elevation view of stakes installed on the deck; and,

FIG. 11 is a side elevation view of the stakes stored in a rack mounted on the top of the tractor cab.

MODES FOR CARRYING OUT THE INVENTION

Figure 3:
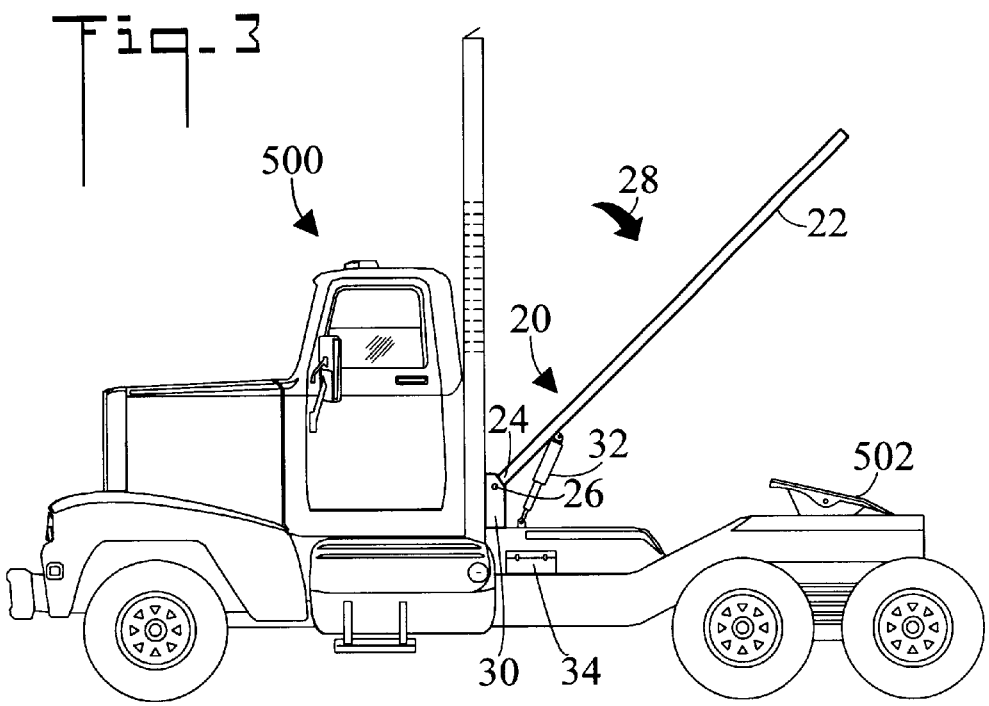
FIG. 3 is a side elevation view of the deck in a partially lowered position.

Referring initially to FIG. 1, there is illustrated a side elevation view of a prior art tractor for a semitrailer truck, generally designated as 500. Tractor 500 includes a fifth wheel 502 for connection to a semitrailer and a longitudinal axis 504.

FIG. 2 shows a side elevation view of the cargo carrying apparatus of the present invention, generally designated 20, installed on the tractor 500. Cargo carrying apparatus 20 includes substantially planar cargo deck 22 having an end portion 24. Deck 22 is shown in its raised upright position. In terms of construction, deck 22 may be of any convenient design such as solid, hollow, or framed. In a preferred embodiment, deck 22 is fabricated from strong lightweight materials so that it may be easily rotated from an upright substantially vertical position to a horizontal position and also to minimize weight which adds to the cost of operating the truck. The end portion 24 is rotatably connected to tractor 500 around a pivot axis 26 which is substantially perpendicular to longitudinal axis 504 (also refer to FIG. 5). Also referring to FIGS. 3 and 4, deck 22 is rotatable in direction 28 from a substantially vertical orientation (FIG. 2) to a substantially horizontal orientation (FIG. 4) with deck 22 disposed above fifth wheel 502. In the preferred embodiment shown in FIG. 4, deck 22 rests upon and is supported by fifth wheel 502. In its substantially vertical upright orientation (FIG. 2), deck 22 is positioned directly behind the cab of tractor 500. It may be appreciated that due to the presence of deck 22, hydraulic, pneumatic, brake lines, and electrical lines used to connect the tractor to the semitrailer might have to be rerouted.

Figure 4:
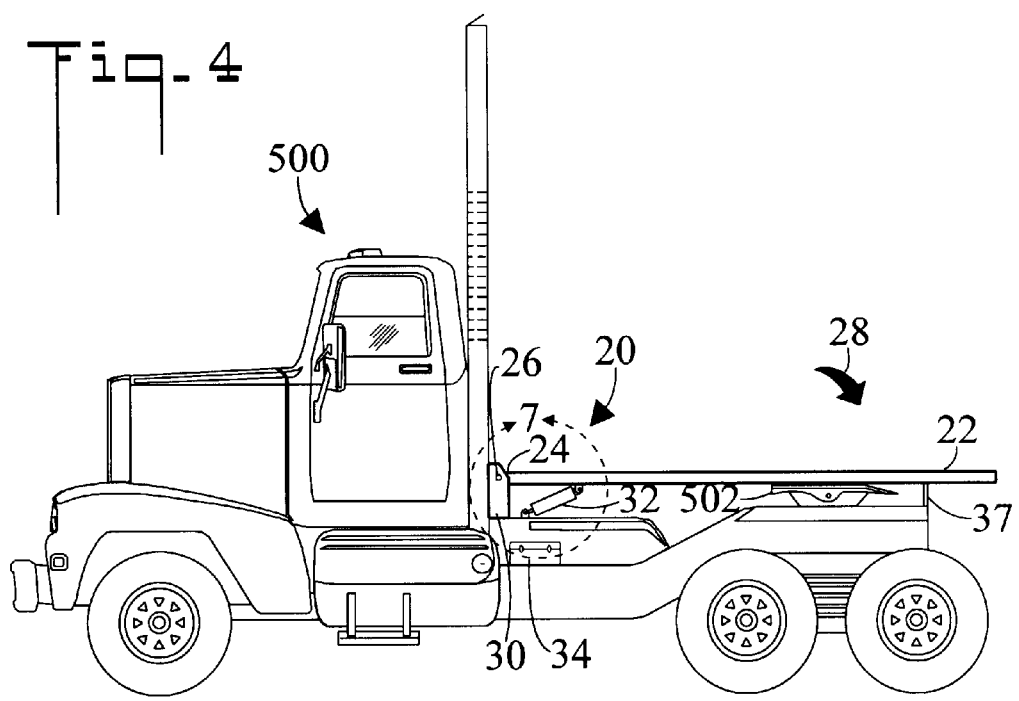
FIG. 4 is a side elevation view of the deck in the lowered horizontal orientation with the deck supported by the fifth wheel.

Deck 22 is rotatably connected to at least two spaced brackets 30 which are connected to the tractor in front of fifth wheel 502 (also refer to FIG. 5). At least one variable length controller 32 is connected between deck 22 and tractor 500. Variable length controller 32 has an extended position and a retracted position. When variable length controller 32 is in its extended position, deck 22 has a substantially upright vertical orientation (FIG. 2). When variable length controller is in its retracted position, deck 22 has a substantially horizontal orientation (FIG. 4). It may be appreciated that other design arrangements could be made wherein the extended position would place deck 22 in a horizontal orientation and the retracted position would place deck 22 in a vertical orientation. In a preferred embodiment, variable length controller 32 is a bidirectional hydraulic cylinder and piston assembly, of which numerous models are well known in the machinery art. Electric motor or pneumatically operated length controllers could also be employed. In a preferred embodiment, the cylinder and piston are operated by 12 volts DC supplied by a battery which is charged by the tractor. The hydraulic controls may be placed at any convenient location, and in a preferred embodiment are placed in a control box 34 mounted on tractor 500. It may be appreciated that other mechanical means such as manually operated jacks, and the like, could also be used to lower and raise deck 22. A first retaining means 35 holds deck 22 in a substantially vertical orientation, and in a preferred embodiment, connects deck 22 to the cab of the tractor 500.

FIG. 3 is a side elevation view of cargo carrying apparatus 20 with deck 22 in a partially lowered position. FIG. 4 is a side elevation view of deck 22 in the lowered horizontal orientation with the deck 22 abutting and supported by the fifth wheel 502. A second retaining means 37 holds deck 22 to tractor 500 when deck 22 is in the substantially horizontal orientation.

FIG. 5 is a top plan view of deck 22. In a preferred embodiment, deck 22 is substantially rectangular and has dimensions of about 9.5 feet long, 8.5 feet wide, and 2 to 4 inches thick. Deck 22 rotates about pivot axis 26. Spaced brackets 30 are attached to tractor 500 and deck 22 is rotatably connected to spaced brackets 30. In a preferred embodiment, deck 22 includes a plurality of stake receiving slots 40 which are adapted to receive a plurality of stakes 42 (FIG. 10). The stakes can be used to enclose the cargo deck 22.

FIG. 6 is an enlarged view of area 6 of FIG. 2 showing variable length controller 32 in the extended position connected between deck 22 and tractor 500. End portion 24 of deck 22 is rotatably connected to spaced brackets 30 and deck 22 rotates about pivot axis 26.

FIG. 7 is an enlarged view of area 7 of FIG. 4 showing variable length controller 32 in the retracted position.

FIG. 8 is a side elevation view of a second embodiment of the cargo carrying apparatus, generally designated as 120, in an upright orientation. FIG. 9 is a side elevation view of the second embodiment in the lowered horizontal orientation. In this embodiment, the deck comprises a main portion 123 and an extension portion 125. Extension portion 125 is rotatably connected to main portion 123. When main portion 123 is in a horizontal orientation and extension portion 125 is lowered, the extension portion coplanarly aligns with main portion 123 thereby forming an elongated deck. In a preferred embodiment, the elongated deck is about 14 feet long and is capable of carrying more cargo than is deck 22.

FIG. 10 is a side elevation view of stakes 42 selectively installed in stake receiving slots 40 of a lowered deck 22 such as shown in FIG. 4. FIG. 11 is a side elevation view of a plurality of stakes 42 selectively stored in a rack 44 connected to the top of the cab of the tractor 500.

When the present invention is installed on a semitrailer truck such as a moving van, the driver loads the semitrailer in the normal manner with furniture and other household goods. He then travels across country or across town with his load. Upon arrival near his destination, he may discover that he cannot unload at the destination because the streets are too narrow. Or he may have been prewarned that he could not unload directly at the destination because of access limitations. Instead of contracting for the services of a smaller truck as would have been necessary in the past, all he has to do is unhook his semitrailer and use his tractor to unload and ferry the goods to the final destination. He activates the variable length controller 32 so that the deck 22 rotates to a substantially horizontal orientation resting on fifth wheel 502 as shown in FIG. 4, opens either the side or rear doors of the semitrailer, and drives his tractor to place the deck 22 adjacent the open doors. If desired, and so equipped, he can then lower some of the stakes 42 from the top of his cab and place them in suitable stake receiving slots in the deck 22 leaving access to the doors on the semitrailer. After transferring some of the cargo from the semitrailer to the deck, he installs additional stakes in the deck across the area of the doors to secure the goods on the deck. He then drives the tractor 500 to the ultimate destination where he unloads it. Five to ten trips with the tractor will typically be sufficient to transfer the contents of a loaded semitrailer to the ultimate destination.

Another use for the tractor equipped with the present invention would be to transfer goods simply for the convenience provided. For example, the driver might park the semitrailer at the front of a house and unload most of the load directly into the front door. He could then use the tractor to transfer some items to the rear of the house by unloading them initially onto the deck 22 and driving to the back of the house with the tractor without having to deal with the large semitrailer.

The preferred embodiments of the invention described herein are exemplary and numerous modifications, dimensional variations, and rearrangements can be readily envisioned to achieve an equivalent result, all of which are intended to be embraced within the scope of the appended claims.

I claim:

1. A semitrailer truck tractor, comprising:

a tractor having a fifth wheel, a longitudinal axis, and a cab having a top; and, a cargo carrying apparatus having:

a deck having an end portion rotatable connected to said tractor and rotatable around a pivot axis substantially perpendicular to said longitudinal axis of said tractor;

said deck rotatable to a substantially horizontal orientation wherein said deck is disposable above said fifth wheel;

said deck having a plurality of stake receiving slots;

a plurality of stakes;

a rack connected to said top of said cab; and, said stakes selectively storable in said rack.

* * * * *